United States Patent [19]

Brunie et al.

[11] 3,928,452

[45] Dec. 23, 1975

[54] PREPARATION OF MIXTURES OF KETONES AND OF THEIR CORRESPONDING ALCOHOLS

[75] Inventors: Jean Claude Brunie, Francheville-Le-Haut; Michel Costantini; Noel Crenne, both of Lyon; Michel Jouffret, Francheville-le-Bas, all of France

[73] Assignee: Rhone-Poulenc S.A., Paris, France

[22] Filed: Dec. 11, 1970

[21] Appl. No.: 97,375

[30] Foreign Application Priority Data

Dec. 12, 1969 France .............................. 69.43179

[52] U.S. Cl. .......... 260/586 R; 260/464; 260/465 R; 260/465 F; 260/465 G; 260/465 K; 260/465.1; 260/465.6; 260/465.7; 260/465.9; 260/590; 260/591; 260/592; 260/593 A; 260/617 R; 260/618 C; 260/631 R; 260/632 R; 260/632 N; 260/633

[51] Int. Cl.² ................ C07C 27/04; C07C 29/00; C07C 45/00

[58] Field of Search ........ 260/586 R, 586 A, 617 R, 260/593 A, 464, 465 R, 465 F, 465 G, 465 K, 465.1, 465.6, 465.7, 465.9, 590, 591, 592, 618 C, 631 R, 632 N, 633

[56] References Cited

UNITED STATES PATENTS

| 2,497,349 | 2/1950 | Farkas et al. ................... 260/631 R |
| 3,505,360 | 4/1970 | Allison ........................ 260/586 R X |

FOREIGN PATENTS OR APPLICATIONS

| 777,087 | 4/1955 | United Kingdom ............. 260/586 R |

Primary Examiner—Norman P. Morgenstern
Attorney, Agent, or Firm—Cushman, Darby & Cushman

[57] ABSTRACT

Secondary hydroperoxides are decomposed in the liquid phase to give a mixture of a ketone and the corresponding alcohol by treatment with an aqueous solution of an inorganic derivative of chromium or vanadium.

15 Claims, No Drawings

PREPARATION OF MIXTURES OF KETONES AND OF THEIR CORRESPONDING ALCOHOLS

The present invention relates to a process for preparing mixtures of a ketone with the corresponding alcohol starting from a hydroperoxide.

It is well known that many metal derivatives exert a catalytic influence on the decomposition of organic hydroperoxides. This decomposition generally gives mixtures in which the nature and the proportion of the constituents can vary widely as a function of factors such as the nature of the metal derivative, the nature of the hydroperoxide and the particular decomposition conditions employed.

Thus, in the decomposition of cycloalkyl hydroperoxides in the corresponding cycloalkane, vanadium anhydride and vanadium acid are employed to promote the conversion of the hydroperoxide into the cycloalkanol (see French Patent Specification No. 1,497,540). It is also known that in the presence of vanadium naphthenate, this decomposition proceeds mainly to the cycloalkanol (see French Patent Specification No. 1,547,427) whilst in the presence of vanadium pentoxide deposited on alumina, cyclohexyl hydroperoxide yields a preponderant amount of cyclohexanone.

In this context, it is also known from French Patent Specification No. 1,580,206 that during the de-peroxidation, in the presence of soluble chromium derivatives, of cycloalkyl hydroperoxide solutions obtained by oxidation of the corresponding cycloalkane, the selectivity towards cycloalkanone is closely connected with technical factors which relate to the number and characteristics of the de-peroxidation zones.

In view of these results, no criterion is available at the present time which, under given conditions, allows one to predict the nature and the proportion of the major product which is liable to be formed in the decomposition of a secondary hydroperoxide.

The present invention provides a process for the production of a mixture of a ketone and the corresponding alcohol which comprises, subjecting, in the liquid phase, a secondary hydroperoxide to the action of an aqueous solution of an inorganic derivative of chromium or vanadium. The term "derivative of chromium or vanadium", means the product which undergoes solution.

This process enables mixtures of ketones and alcohols to be obtained in which the ketone is preponderant.

Secondary hydroperoxides which may be used in the process include compounds having more than four carbon atoms and having the following general formula:

wherein $R_1$ and $R_2$, which may be identical or different, each represent a monovalent radical such as a linear or branched aliphatic radical having from 1 to 18 carbon atoms, an alicyclic radical having from 3 to 16 carbon atoms in the ring, a monocyclic or polycyclic aryl radical, a heterocyclic radical containing at least one of the atoms O, S, N, P, Si or B, a radical resulting from a combination of more than one of the radicals mentioned above, joined directly or by one of the aforementioned hetero atoms, or also by a divalent grouping such as

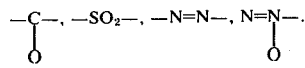

Hydroperoxides of general formula (I) in which the symbols $R_1$ and $R_2$ together form a divalent radical such as an alkylene or alkenylene radical having from 4 to 15 carbon atoms or also a radical of formula:

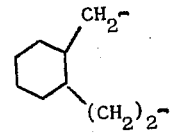

or

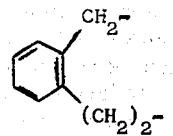

may also be used. The abovementioned radicals for $R_1$ and $R_2$ may in addition carry substituents such as fluoro, chloro, nitro or nitrile, which do not disturb, or practically do not disturb, the decomposition of the hydroperoxide into the corresponding ketone.

The hydroperoxides (I) can be used in the form of solutions or suspensions in water; for technical and economic reasons, it is advantageous in this case to use amounts of water such that the proportion by weight of hydroperoxide in the solution or in the suspension is between 2% and 20%.

The process can also be carried out in the presence of an organic solvent for the hydroperoxide, which is preferably immiscible with water. This solvent can for example be a linear ether, an ester such as a lower alkyl ester of an alkanoic or aryl carboxylic acid or a hydrocarbon. On account of their ease of access, it is preferred to use hydrocarbons, particularly alkanes or alkenes having from 6 to 20 carbon atoms, cycloalkanes or cycloalkenes having from 5 to 16 ring carbon atoms, optionally substituted by alkyl radicals having from 1 to 4 carbons atoms, as well as benzene and its derivatives monosubstituted or polysubstituted by a chlorine or fluorine atom, an alkyl radical having from 1 to 4 carbon atoms. Substituted benzene derivatives having one or more alkoxy groups containing from 1 to 4 carbon atoms, or nitrile or nitro groups, or a phenyl radical derived from one of the substituted derivatives of benzene described above can also be used. Aromatic hydrocarbons having partially or totally hydrogenated condensed nuclei, such as tetralin and decalin, can also be used. For the reasons given previously, it is then advantageous to use amounts of water and organic solvent such that the proportion by weight of hydroperoxide in the mixture which is reacted is between the values given above. When an organic solvent such as that defined above is used, the weight of water is at least of the order of 1% relative to the weight of the organic solution, which, if necessary, is saturated with water; the preferred weights relative to the same reference standard are between 2% and 10% for the vanadium derivatives, and between 30% and 70% for the chromium derivatives.

Halides, oxyhalides and oxides may be advantageously used in the process as the inorganic derivative of chromium or vanadium. The preferred derivatives are the chloride $CrCl_3 \cdot 6H_2O$, the oxychloride $VOCl_2$, and the oxide $CrO_3$.

The amount of metal derivative used can vary depending on the nature of the metal, but, as a general rule, it is chosen so that it contributes from 0.1 to 20 gram atoms of elementary metal per 100 mols of hydroperoxide used. The preferred amount, relative to 100 mols of hydroperoxide, is between 1 and 5 gram atoms of elementary vanadium and, as regards elementary chromium, between 5 and 15 gram atoms for $CrCl_3 \cdot bH_2O$ and between 0.3 and 1 gram atom for $CrO_3$.

The temperature employed depends to a certain extent on the metal derivative used. Thus, with vanadyl chloride reaction rates which are satisfactory are obtained at temperatures as low as room temperature (20° to 25°C). In the case of chromium derivatives, it is generally necessary to heat the mixture, at least at the beginning of the reaction; satisfactory reaction rates are then obtained without it being necessary to heat to above 180°C, and temperatures between about 25° and 150°C are, in general, very suitable.

In practice, the hydroperoxide, water and, if desired, the organic solvent are mixed at room temperature, and then the metal derivative is added. The mixture is then heated, if necessary. Alternatively, the catalyst can be introduced into the mixture of the reactants after it has been heated to the chosen temperature.

If the mixture comprises immiscible phases, it is recommended to encourage their contact by stirring or otherwise agitating the mixture. Since the reaction is exothermic, the temperature may be regulated by any regulating system which is appropriate for removing the heat generated by the reaction. Depending on the nature of the metal derivative, its proportion and the temperature employed, the duration of the reaction can vary from a few minutes to a few hours. If the temperature to be employed is higher than the normal boiling point of the mixture, the reaction can be carried out under pressure; the maintenance of the mixture in the liquid phase can be ensured, if necessary, by introducing an inert gas such as nitrogen or argon. At the end of the reaction, the ketone and the alcohol can be separated from the final solution by the application of the customary methods, for example by distilling the organic phase.

The hydroperoxide used in the process may be obtained by oxidation of the corresponding hydrocarbon with oxygen or a gas containing oxygen. The hydroperoxide can then be extracted from the crude oxidation solution and purified by known methods, for example via its sodium salt, before subjecting it to deperoxidation under the conditions described previously. The hydroperoxide in solution in the hydrocarbon corresponding to the hydroperoxide may be used advantageously in this case.

The process of the invention is also directly applicable to crude solutions of hydroperoxide obtained by oxidising with air, a hydrocarbon of general formula:

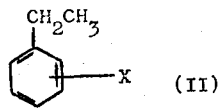

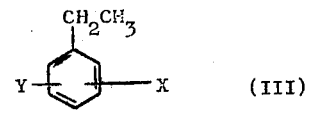

wherein X represents a hydrogen or chlorine atom, an alkyl radical such as methyl and t-butyl, an alkoxy group such as methoxy, or a nitrile or nitro group, and Y represents an alkyl radical such as methyl and t-butyl. Crude oxidation solutions can also be used which have been obtained by oxidising, with air, a cycloalkane or a cycloalkene having from 5 to 16, preferably from 6 to 12, ring carbon atoms, or also a partially or totally hydrogenated hydrocarbon with condensed aromatic nuclei, such as tetrahydronaphthalene or decahydronaphthalene. In this case, the benefit which is obtained from the process of the invention is all the more important as one is concerned with oxidation products which are specially prepared for the purpose of hydroperoxide formation, and the proportion of undesirable products in the initial starting material is then at a minimum. In practice therefore, it will generally be advantageous to start with an oxidation product obtained by oxidising, with air, a hydrocarbon such as that defined above, in the liquid phase and without a catalyst, optionally in the presence of initiators and stabilising agents for the hydroperoxides, optionally under pressure, the temperature and the degree of conversion being chosen in such a way as to limit as much as possible the production of undesirable products. When it is particularly intended to obtain the hydroperoxide, the oxidation is, in general, limited to a proportion of oxidation products in the solution of below 30%, preferably between 2% and 20%.

In addition to the hydroperoxide, these oxidation products contain a small proportion of the corresponding ketone and alcohol as well as various by-product by-products as acids and esters. The oxidation product can be brought to any desired concentration before being subjected to the treatment according to the invention; since the oxidation is often carried out under pressure, a simple means of concentrating the oxidation product thus produced is to cause the hot oxidation product leaving the oxidiser to undergo a release in pressure. It may also be subjected to a preliminary washing with water so as to eliminate, at least partially, any acid products.

The following examples illustrate the invention.

EXAMPLE 1

450 g of cyclohexane and 52.6 g of cyclohexyl hydroperoxide (95.5% pure), are introduced into a 2 liter volume flask provided with a reflux condenser and a stirrer followed by an aqueous solution prepared from 225 cm³ of water and 10.8 g of chromium trichloride hexahydrate.

The mixture is heated, whilst stirring, up to the boiling point (74°C) and is kept at this temperature for 1 hour 30 minutes.

After cooling, the organic phase is decanted, the aqueous phase is extracted with ether the organic phases are combined, and the ether is then removed.

The residual mixture is then subjected to distillation, which allows 36 g of cyclohexanone and 4 g of cyclohexanol to be isolated.

EXAMPLE 2

1000 g of a cyclohexane solution containing 9.85% by weight of cyclohexyl hydroperoxide, are introduced into a 2 liter volume flask which is equipped as stated in Example 1, followed by 20 cm³ of an aqueous solution prepared by dissolving $VOCl_2$ and containing 0.89 g of elementary vanadium.

The mixture is then stirred, and its temperature rises rapidly to 74°C. After 30 minutes the hydroperoxide has completely decomposed. The organic phase is decanted and washed with 50 cm³ of an aqueous solution of sodium bicarbonate (10% by weight), and twice with 50 cm³ of water.

After the organic phase is dried, it is found to contain 70.5 g of cyclohexanone and 9.95 g of cyclohexanol.

EXAMPLE 3

51 g of ethylbenzene, 7.3 g of 1-phenylethyl hydroperoxide and 33 g of water are introduced into a 250 cm³ volume flask which is equipped as stated in example 1. The mixture is then heated until it boils (95°C) and 2 cm³ of an aqueous solution prepared by dissolving $CrO_3$ and containing 6.87 g of elementary chromium per liter of solution are then added.

The mixture is then kept at the boil, whilst stirring, for 1 hour; by which time the hydroperoxide has completely decomposed.

The organic layer is separated by decanting and the aqueous phase is then extracted twice, using 20 cm³ of ether each time. The organic phases are combined and the ether is then removed.

By means of chromatographic and chemical (oxime formation) determination, the residue is found to contain 6 g of acetophenone; no substantial amount of α-phenylethyl alcohol is detected.

EXAMPLE 4

The apparatus described in Example 3 is used.

50 g of a solution, prepared from 5.34 g of cyclohexenyl hydroperoxide (93.7% pure) and cyclohexene, are introduced into the flask. This solution is then heated until it boils and 30 cm³ of an aqueous solution, prepared by dissolving $CrO_3$ and containing, by weight, 9.9 mg of elementary chromium, are then added thereto over the course of 2 minutes. The mixture is then kept at the boil, whilst stirring, for a further 30 minutes by the end of which time the hydroperoxide has completely decomposed.

After decanting, the aqueous layer is extracted three times, using 50 cm³ of ether each time, and the organic phases are then combined. After the ether has been removed, chromatographic determination and by oxime formation indicates that the residual mixture contains 4.15 g of cyclohexenone and 0.09 g of cyclohexenol.

EXAMPLE 5

The apparatus described in Example 1 is used.

1 kg of a technical solution, obtained by oxidation of cyclohexene and containing, by weight, 5.64% of cyclohexenyl hydroperoxide 0.37% of cyclohexenol and 0.51% of cyclohexenone, is introduced into the flask. 500 cm³ of an aqueous solution prepared by dissolving $CrO_3$ and containing 0.1 g of elementary chromium are then added.

The mixture is heated to boiling (72°C), whilst stirring, and kept under these conditions for 1 hour. After cooling, the mixture is treated as described in Example 4.

After the ether has been distilled off, 250 g of methyl orthoborate are added to the residual mixture, and the whole is then heated to boiling whilst simultaneously removing, by distillation, the methanol formed as well as the excess methyl orthoborate and excess cyclohexene; 44 g of cyclohexenone are collected by continuing the distillation.

The residue is treated at 60°C with 50 g of water for 1 hour. After cooling, the mixture is extracted three times, using 25 cm³ of ether each time. The ethereal phases are combined, the ether is driven off, and the residue is distilled and 9 g of cyclohexenol are collected.

The technical hydroperoxide solution used was prepared by oxidising cyclohexene in the liquid phase at 100°C at a pressure of 20 bars with air having its oxygen content reduced to 12.5%, at a rate of 60 l/h and for 1 hour, in a stainless steel autoclave which had previously been rendered passive by means of sodium pyrophosphate.

EXAMPLE 6

The apparatus described in Example 1 is used.

738 g of a technical cyclohexane oxidation solution containing, by weight, 12.6% of cyclohexyl hydroperoxide 1.8% of cyclohexanone and 2.6% of cyclohexanol, are introduced into the flask. 420 g of water and 30 cm³ of an aqueous solution prepared by dissolving $CrO_3$ and containing 0.19 g of elementary chromium are then added. The mixture is then heated and refluxed at 71°C, whilst stirring, for 2 hours.

After cooling, the organic phase is separated and the aqueous phase is then extracted three times with 100 cm³ of ether. The organic phases are combined, the ether is removed, and the residue is then distilled to give 72 g of cyclohexanone and 30 g of cycloheanol.

The technical hydroperoxide solution used was prepared by oxidising cyclohexane in the liquid phase at 180°C under a pressure of 18 bars by air with an oxygen content reduced to 10%, and limiting the oxidation to a proportion of 4% of non-volatile products. The oxidation product was then subjected to a release in pressure down to atmospheric pressure, and was then pre-concentrated. Finally, it was washed at 25°C using 10% of its weight of water.

We claim:

1. Process for preparing a hydroperoxide decomposition product which consists essentially of a mixture of a major proportion of a ketone of the general formula $R_1R_2CO$ and a minor proportion of the corresponding alcohol of the general formula $R_1R_2CHOH$ in which $R_1$ and $R_2$, which may be identical or different, each represent a monovalent linear or branched aliphatic hydrocarbon radical having from 1 to 18 carbon atoms, an alicyclic hydrocarbon radical having from 3 to 16 carbon atoms in the ring, or a monocyclic or polycyclic aromatic hydrocarbon radical, or wherein $R_1$ and $R_2$ together form a divalent alkylene or alkenylene radical having from 4 to 15 carbon atoms or a radical of formula:

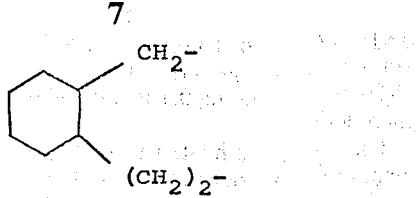

or

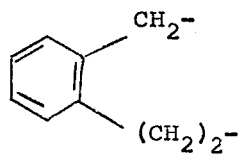

or wherein $R_1$ and $R_2$ are as defined above but is substituted by at least one fluoro, chloro, nitro or nitrile group by treating a secondary hydroperoxide of the general formula $R_1R_2COOH$ where $R_1$ and $R_2$ are as defined above, at a reaction inducing temperature in the liquid phase with an aqueous solution of $CrCl_3 \cdot 6H_2O$, $CrO_3$ or $VOCl_2$.

2. Process according to claim 1, wherein the treatment is carried out in the presence of an organic solvent for the hydroporoxide which is immiscible with water.

3. Process according to claim 2 wherein the organic solvent is a hydrocarbon of formula $R_1R_2CH_2$ where $R_1$ and $R_2$ are as defined in claim 1.

4. Process according to claim 3 wherein the concentration of the hydroperoxide in the liquid phase is 2 – 20% by weight.

5. Process according to claim 3 wherein the amount of water in the aqueous solution is 2 – 10% by weight of the organic solvent when $VDCl_2$ is used, or 30 – 70% by weight of the organic solvent when $CrCl_3 \cdot 6H_2O$ or $CrO_3$ is used.

6. Process according to claim 1 wherein the aqueous solution of $CrCl_3 \cdot 6H_2O$, $CrO_3$ or $VOCl_2$ used in an amount which provides 0.1 to 20 gram atoms of chromium or vanadium per 100 mols of hydroperoxide.

7. Process according to claim 6 wherein $CrCl_3 \cdot 6H_2O$ is used in an amount to provide 5–15 gram atoms Cr per 100 mols hydroperoxide.

8. Process according to claim 6 wherein $CrO_3$ is used in an amount to provide 0.3 to 1 gram atom Cr per 100 mols hydroperoxide.

9. Process according to claim 6 wherein $VOCl_2$ is used in an amount to provide 1–5 gram atoms V per 100 mols hydroperoxide.

10. Process according to claim 1 wherein the hydroperoxide is one of the formula

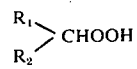

wherein $R_1$ and $R_2$ together represent a divalent alkylene or alkenylene radical having 4 – 15 carbon atoms.

11. A process according to claim 1 wherein a solution of 2 – 20 % by weight of a cycloalkyl hydroperoxide or cycloalkenyl hydroperoxide in the corresponding cycloalkane or cycloalkene having a total of 5 – 16 carbon atoms, is treated with an aqueous solution of $CrCl_3 \cdot 6H_2O$, $CrO_3$ or $VOCl_2$, the resulting mixture maintained at the temperature necessary to bring about substantially complete decomposition of the hydroperoxide with a desired time interval and the resulting cycloalkanone and cycloalkanol or cycloalkenone and cycloalkenol recovered from the reaction product.

12. A process according to claim 11 wherein $CrCl_3 \cdot 6H_2O$ or $CrO_3$ is used and the mixture is heated to its boiling point to decompose the hydroperoxide.

13. A process according to claim 11 wherein $VOCl_2$ is used and the hydroperoxide is decomposed without heating the mixture externally.

14. Process according to claim 1 wherein said reaction inducing temperature is about 20°C. to about 180°C.

15. Process according to claim 1 wherein said reaction inducing temperature is about 25°C. to about 150°C.

* * * * *